United States Patent
Ganguly et al.

(10) Patent No.: US 9,294,437 B1
(45) Date of Patent: Mar. 22, 2016

(54) REMOTELY CONFIGURED NETWORK APPLIANCES AND SERVICES

(75) Inventors: Arijit Ganguly, Kirkland, WA (US); Andrew B. Dickinson, Seattle, WA (US); Christopher J. Lefelhocz, Bothell, WA (US); Manish Agarwal, Redmond, WA (US); Ian R. Searle, Bellevue, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 275 days.

(21) Appl. No.: 13/461,478

(22) Filed: May 1, 2012

(51) Int. Cl.
*G06F 15/173* (2006.01)
*H04L 29/06* (2006.01)

(52) U.S. Cl.
CPC ............ *H04L 63/00* (2013.01); *H04L 63/0272* (2013.01); *H04L 63/20* (2013.01)

(58) Field of Classification Search
CPC ..... H04L 63/0272; H04L 29/06; H04L 12/66; H04L 12/5695; H04L 47/10; H04L 47/788; H04L 47/805; H04L 47/822; H04L 47/824; H04L 47/801; H04L 63/0218
See application file for complete search history.

(56) References Cited

U.S. PATENT DOCUMENTS

| | | | | |
|---|---|---|---|---|
| 7,444,398 | B1 * | 10/2008 | Matthews | H04L 29/06 370/395.21 |
| 7,483,396 | B2 | 1/2009 | Steindl | |
| 7,542,468 | B1 | 6/2009 | Begley et al. | |
| 8,345,692 | B2 * | 1/2013 | Smith | H04L 12/462 370/396 |
| 8,514,868 | B2 * | 8/2013 | Hill | H04L 12/66 370/389 |
| 8,695,059 | B2 * | 4/2014 | Kopti | H04L 63/20 726/1 |
| 9,059,933 | B2 * | 6/2015 | Doerr | G06F 9/5072 |
| 2004/0098490 | A1 | 5/2004 | Dinker et al. | |
| 2004/0220984 | A1 * | 11/2004 | Dudfield | H04L 41/0893 708/200 |
| 2006/0236402 | A1 | 10/2006 | Russell et al. | |
| 2007/0058645 | A1 * | 3/2007 | Nannra | H04L 41/046 370/401 |
| 2007/0130326 | A1 | 6/2007 | Raphael et al. | |
| 2007/0150480 | A1 * | 6/2007 | Hwang | G06Q 10/00 |
| 2008/0148381 | A1 | 6/2008 | Aaron | |
| 2010/0217837 | A1 * | 8/2010 | Ansari | G06Q 30/04 709/218 |
| 2011/0022812 | A1 | 1/2011 | van der Linden et al. | |
| 2011/0153719 | A1 * | 6/2011 | Santoro et al. | 709/203 |
| 2011/0191610 | A1 | 8/2011 | Agarwal et al. | |
| 2011/0197275 | A1 | 8/2011 | Chasin et al. | |

(Continued)

OTHER PUBLICATIONS

U.S. Appl. No. 13/461,566, filed May 1, 2012, titled "Network Gateway Services and Extensions".

(Continued)

*Primary Examiner* — Ruolei Zong
*Assistant Examiner* — Padma Mundur
(74) *Attorney, Agent, or Firm* — Kilpatrick Townsend & Stockton LLP

(57) ABSTRACT

A network gateway is implemented on behalf of a customer entity. The network gateway may be implemented using a distributed computer system and the network gateway may connect a network of the customer entity to a public communications network. The network gateway may include network-related services without the need for adding specialized hardware. The network gateway may be provisioned programmatically in response to instructions received from the customer entity. The network gateway may be provisionable and accessible over several different types of data connections. The network gateway, by virtue of being implemented on a distributed computer system, is scalable upon demand without additional input by the customer entity.

22 Claims, 9 Drawing Sheets

(56) References Cited

U.S. PATENT DOCUMENTS

| | | | |
|---|---|---|---|
| 2011/0225647 A1* | 9/2011 | Dilley | H04L 63/0218 726/14 |
| 2011/0231899 A1* | 9/2011 | Pulier | G06F 9/45558 726/1 |
| 2011/0314155 A1 | 12/2011 | Narayanaswamy et al. | |
| 2012/0185913 A1* | 7/2012 | Martinez | G06F 9/455 726/1 |
| 2012/0222084 A1* | 8/2012 | Beaty | H04L 43/0817 726/1 |

OTHER PUBLICATIONS

U.S. Appl. No. 13/461,596, filed May 1, 2012, titled "Intelligent Network Service Provisioning and Maintenance".
U.S. Appl. No. 13/461,661, filed May 1, 2012, titled "Flexibly Configurable Remote Network Identities".

* cited by examiner

REMOTELY CONFIGURED NETWORK APPLIANCES AND SERVICES

This application incorporates by reference for all purposes the full disclosure of co-pending U.S. patent application Ser. No. 13/461,661, filed May 1, 2012, entitled "FLEXIBLY CONFIGURABLE REMOTE NETWORK IDENTITIES", co-pending U.S. patent application Ser. No. 13/461,566, filed May 1, 2012, entitled "NETWORK GATEWAY SERVICES AND EXTENSIONS", and co-pending U.S. patent application Ser. No. 13/461,596, filed May 1, 2012, entitled "INTELLIGENT NETWORK SERVICE PROVISIONING AND MAINTENANCE".

BACKGROUND

As an increasing number of applications and services are being made available over networks such as the Internet, customer entities and associated data are increasingly exposed to security threats such as unsolicited e-mail ("spam"), distributed denial of service (DDoS) attacks, trojans, worms, viruses, and the like. In order to alleviate such problems, customer entities, enterprise and otherwise, have turned to dedicated hardware that, in networking terms, is positioned topographically near to network ingress/egress points, to implement services such as spam control, firewalling, DDoS protection, and other services for protecting networks to enable the networks to function effectively. Such hardware is often expensive and difficult to properly configure, maintain and support. As such, the addition or maintenance of such hardware can often have a significant impact on an organization, possibly being disruptive and/or decreasing productivity. Additionally, hardware-based threat management solutions typically do not automatically scale their capabilities up and down based on demand, perceived threat level, and/or the like.

BRIEF DESCRIPTION OF THE DRAWINGS

Various embodiments in accordance with the present disclosure will be described with reference to the drawings, in which.

DETAILED DESCRIPTION

Figure 1:
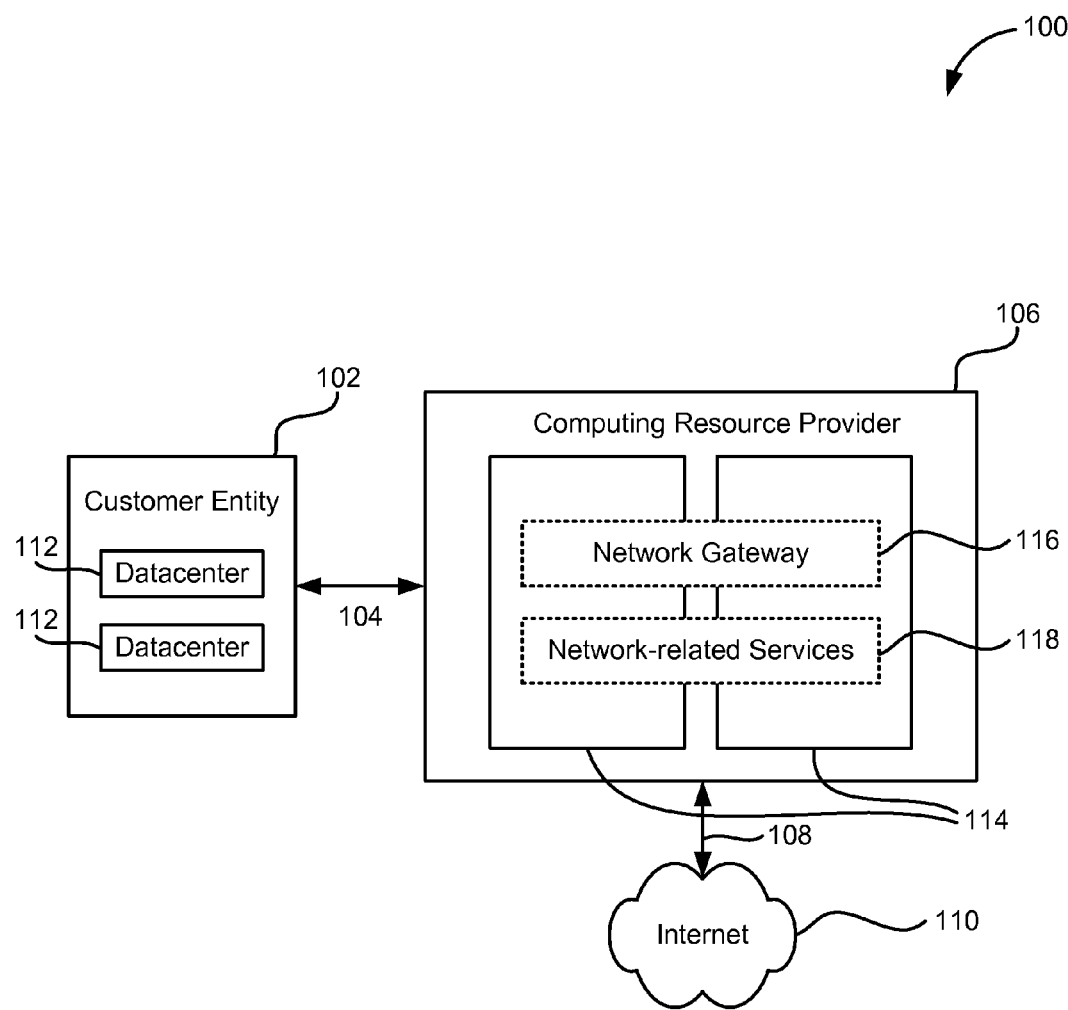
FIG. 1 illustrates an example of a network configuration that can be used in accordance with at least one embodiment.

Systems and methods in accordance with various embodiments of the present disclosure may overcome one or more of the aforementioned and other deficiencies experienced in conventional approaches to providing access to data in an electronic environment. In particular, various embodiments provide network connectivity and related services that enable customer entities to access a computing resource provider that provides one or more computing resources through computing resource services, such as Web services. For example, a customer entity may provision, through such a computing resource service, a network connection configured with network-related services, such that the network-related services are implemented and provided to the customer entity utilizing the computing resources. Computing resource services may include one or more computing resources accessible and/or provisionable across a network through an application programming interface (API), user interface (UI), or other interface where the one or more computing resources are scalable and expandable to provide the capacity needed for the customer entity or the implemented services.

In some embodiments, the network connection between the customer entity and the computing resources may be a direct or Intranet-like connection, such as a connection made via a fiber-optic link, twisted-pair copper cabling such as Category 5e, wireless protocol such as Wi-Fi, or other connection linking the customer entity and computing resources over a local or wide-area network. In some embodiments, the network connection between the customer entity and the computing resources may occur over the Internet or similar public network, with or without the benefit of a data securing mechanism such as a Virtual Private Network (VPN) tunnel.

In some embodiments, the computing resources are further connected to the Internet or other communications network. Systems and methods in accordance with various embodiments provide the ability to provision and configure the computing resources to provide a network or Internet gateway (or other ingress and egress point for network traffic) to the connected customer entity. Some embodiments include the implementation, via the computing resources, of various network-related services provided to the customer entity via the network connection. Such network-related services, in some embodiments, serve to monitor, secure, filter, and/or protect the data retrieved (e.g., by the customer entity's request) from the Internet or other network by the computing resources, prior to further submitting the retrieved data to the requesting customer entity. In some embodiments, the network-related services monitor, secure, filter and/or protect data sent by the customer entity prior to submitting such data over the Internet or other public network.

Some embodiments provide for the network-related services to be provided by third parties, i.e., entities that do not own, administer and/or control the computing resources that implement the network-related services. The third party network-related services, in some embodiments, include services such as distributed denial of service (DDoS) protection, firewall, spam control, data encryption, or similar network-related services. In some embodiments, such network-related services may include functionality ordinarily implemented in a physical network appliance, such as a physical firewall device. In some embodiments, the implementation of the services may be handled through an API, UI, or other interface.

Systems and methods in accordance with various embodiments provide the ability to intelligently provision, scale and maintain the network-related services and/or the network or Internet gateway implemented using the computing resources. For example, in some embodiments, provisioning of the gateway and/or network-related services is computer-implemented and programmatic in nature, via APIs. Similarly, in some embodiments, the gateway and/or network-related services have programmatically-implemented external and/or internal monitoring in place and maintenance, service requests, and the like are all performed programmatically (or otherwise automatically) to the greatest extent possible. In some embodiments, upon a change in demand, systems and/or methods are in place for determining whether a greater or lesser level of computing resources is necessary to perform the gateway and/or network-related services, determining what specific computing resources are necessary to address the change in demand, then scaling, transparently to the customer entity, the level of computing resources allocated to implementing the gateway and/or network-related services.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

FIG. 1 illustrates an example of a network configuration 100 for implementing aspects in accordance with various embodiments. In this example, a customer entity 102 is connected through a network 104 to access a computing resource provider 106. At least one host or server 106 is further connected through a second network 108 to a public network 110.

In some embodiments, the customer entity 102 may comprise one or more datacenters 112, each having therein one or more networks of computing resources. However, it is appreciated that a customer entity may comprise a single workstation, a cluster of workstations, a single server, a cluster of servers, a datacenter, multiple datacenters (as illustrated), a distributed computing resource, or any level of complexity in between. The customer entity may have one Internet address, multiple Internet addresses, or entire Internet address ranges (e.g., Internet Protocol version 4 (IPv4) or Internet Protocol version 6 (IPv6) address blocks) that it wishes to allocate to a particular division of its network infrastructure. For example, such division may depend upon a server's role as a web server or application server, on the geographic location of a remote user requesting services resident on the customer entity's servers, and/or the need for balancing load across disparate customer entity servers.

In some embodiments, the network 104 comprises one or more devices for connecting the customer entity 102 and the computing resource provider 106. The connection may occur over a public network such as the Internet, and may or may not involve a securing mechanism such as a virtual private network tunnel. In an exemplary embodiment, the connection occurs over a private network or a direct connection. Such a direct connection may occur via fiber-optic cabling, copper cabling, or wireless transmissions (such as Wi-Fi, by satellite link, over a cellular or mobile data network such as GSM, LTE, EVDO, CDMA, WiMax, WiBro and the like), or by any other appropriate connection type. The network may be multiplexed for speed or redundancy (i.e., distributed over multiple constituent networks or connections), or consummated via a single point-to-point topology.

In some embodiments, the computing resource provider 106 comprises at least one host or server 114. In an embodiment, the computing resource provider includes several commodity servers configured in a distributed system. The distributed system, in part or whole, is configured to operate as a network gateway 116 for the connected customer entity. The network gateway 116 serves as an ingress/egress point for data retrieved from and/or sent to external hosts on, e.g., the Internet 110 via the second network 108. The second network may be a connection or connections of any suitable type. Thus, in an embodiment, the computing resource provider and distributed system operates as a remote network gateway for a connected customer entity. In embodiments where the customer entity comprises a computing resource provisioned from the same computing resource provider that spawned the network gateway, the network connection 104 may be virtual, rather than physically manifested.

In some embodiments, computing resources of the computing resource provider 106 are configurable by the customer entity and/or the computing resource provider to extend the implemented network gateway 116 with network-related services 118. Such network-related services include distributed denial of service (DDoS) attack prevention and mitigation, data firewalling, e-mail spam control, data encryption, and other services for managing and/or manipulating network traffic. The network-related services may be of the computing resource provider's own design, or may be developed and/or implemented by a third party. It will be appreciated that such third-party network-related services as implemented using the computing resource provider provide, in some embodiments, similar functionality to that of hardware devices implementing network-related services of like kind, without need for the customer entity to own, maintain, or otherwise provision such hardware devices. In accordance with an embodiment, the network-related services may monitor, alter, augment, or selectively reject data, in part or whole, passing between the customer entity and the public network through the implemented network gateway.

Figure 2:
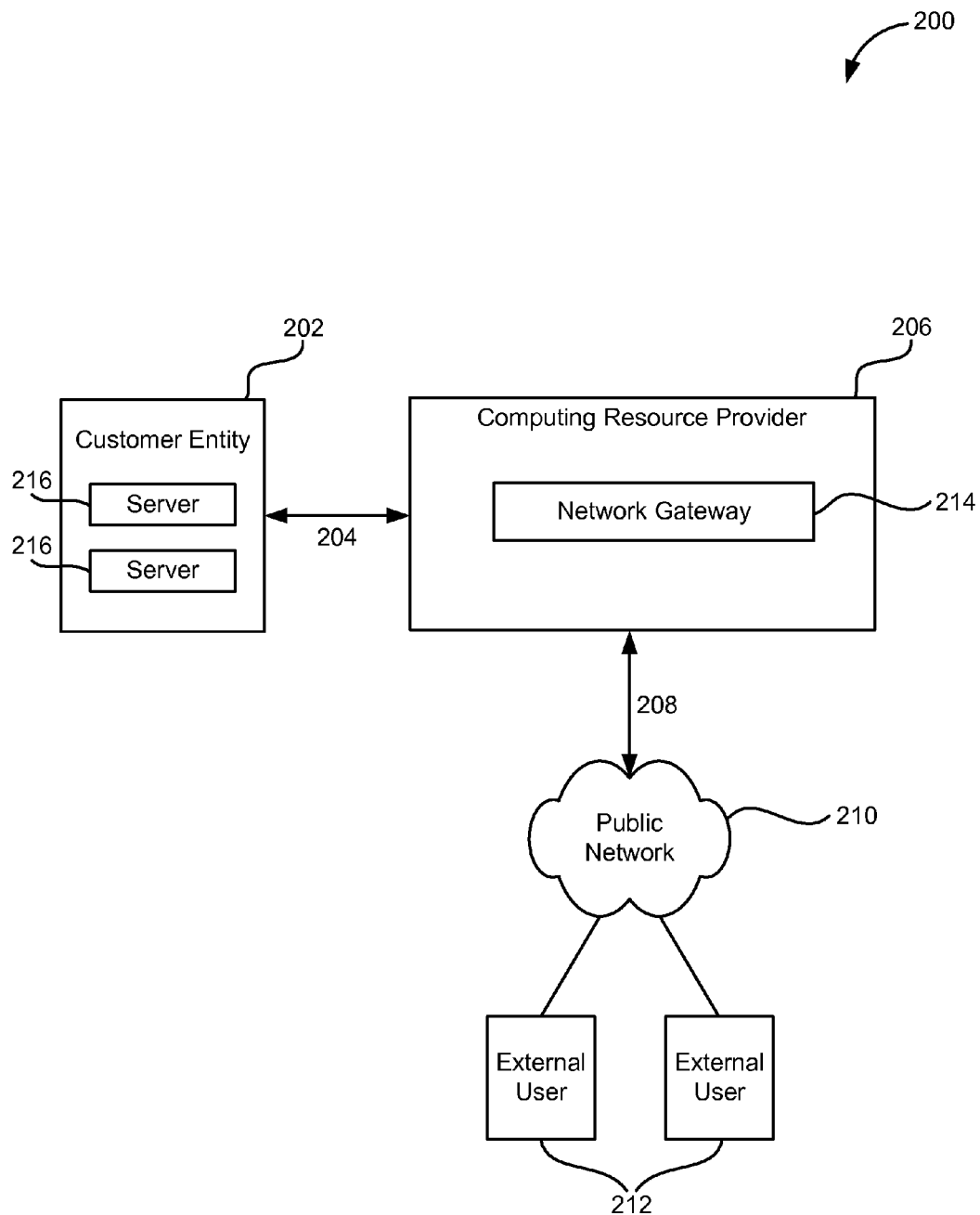
FIG. 2 illustrates, from a customer's perspective, a network configuration used in accordance with at least one embodiment.

FIG. 2 illustrates, from a customer entity's perspective, an example of a network configuration 200 for implementing aspects of various embodiments. The network configuration 200 may incorporate aspects of the previously described network configuration 100. In an embodiment, the customer entity 202 connects through the network 204 to access computing resource provider 206. Computing resource provider 206 is further connected through a second network 208 to a public network 210, which in turn is connected to external users 212. External users may include end user computing devices, web servers, and hosts connected to the Internet or other suitable communications network. In some embodiments, the computing resource provider is configured to operate as a network gateway 214 that serves as an ingress and egress point for data retrieved from and/or sent to external users 212 via the public network 210, e.g., the Internet. In some embodiments, the customer entity may comprise a portion of the computing resources of the computing resource provider, rather than a physically separate entity. For example, in an embodiment, the customer entity has control over a portion of the computing resources of the computing resource provider, and wishes to use a network gateway, implemented using similar computing resources of the same computing resource provider, to connect the computing resources under its control to the Internet.

As previously mentioned, in an embodiment, the customer entity 202 may have servers 216 serving different purposes, such as web servers, storage servers or application servers. As may be appreciated, the customer entity may wish to advertise the availability of such servers to different subsets of external users 212 on a variety of criteria, including but not limited to geographic location, latency, available bandwidth, corresponding region, or the security credentials of the requesting external user. Toward this end, when connected to the computing resource provider 106, the customer entity may provide public identifiers, such as an IPv4 or IPv6 address or a range of such addresses, to the computing resource provider to advertise to external users on the customer entity's behalf. The customer entity may specify, in any combination, the server or servers, or any portion of functionality implemented by the server or servers, to which a given public identifier or identifiers maps. In some embodiments, the computing resource provider detects various operating parameters of an external user or users connected to the computing resource provider over the internet, and subsequently advertises the customer entity-specified identifier range to the external user as appropriate. For example, if the customer entity specifies that one cluster of servers bears a given identifier and specifies to the computing resource provider that all external users in a specific geographic area connect to that cluster of servers by default, the computing resource provider routes connected external users accordingly. As another example, if the customer entity comprises a portion or instance of the computing resources of the computing resource provider, the customer entity may specify that a given computing resource under its control be made available to a specific subset of external users. The external users may be related to the customer entity, the computing resource provider, both, or neither.

Figure 3:
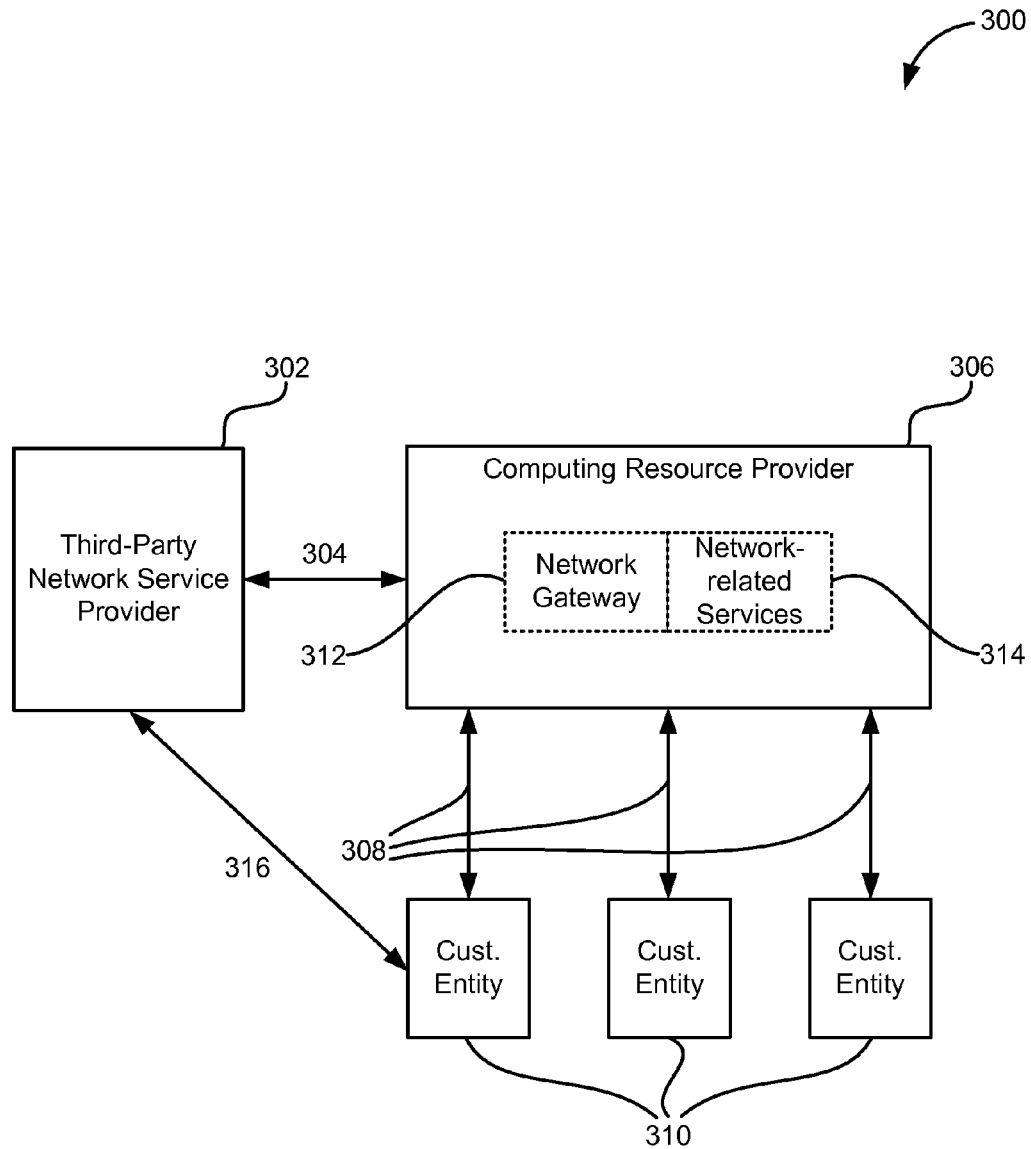
FIG. 3 illustrates, from a third party network-related service provider's perspective, a network configuration used in accordance with at least one embodiment.

FIG. 3 illustrates, from a third party service provider perspective, an example of a network configuration 300 for implementing aspects in accordance with various embodiments. Network configuration 300 may, in some embodiments, be analogous to previously described network configurations 100 and 200. In some embodiments, a third party service provider 302 connects through network 304 to computing resource provider 306. Computing resource provider 306 is further connected through a network or networks 308 to a customer entity or customer entities 310. In some embodiments, the customer entity or customer entities utilize the computing resource provider as a network gateway 312 as previously described. In some embodiments, as previously discussed, the computing resource provider is configurable to extend the implemented network gateway with network-related services 314, which may be of the computing resource provider's own design or that of a third party. Such services, as mentioned, include distributed denial of service (DDoS) attack prevention and mitigation, data firewalling, e-mail spam control, data encryption, and other services of like kind. In embodiments where third parties provide the network-related services, such services may reside upon the third party service provider's hardware and accessed by the computing resource provider over the network 304 through an interface, such as an API or web service, or preferably, implemented by the computing resource provider itself. Such an approach realizes the benefits of the computing resource provider, e.g., scalability, level of support, low latency relative to connected customer entities 310, and so forth. In addition, the third party service provider benefits from decreased overhead and wider public acceptance and implementation, thereby increasing revenue. In some embodiments, the customer entity may request the network-related services directly through the third party service provider, e.g., by a network connection 316, while utilizing the computing resource provider as a network gateway as previously described.

In some embodiments where the computing resource provider implements the network-related services, the third party service provider provides the computing resource provider with algorithms in the form of code executable by computing resources of the computing resource provider to effect the service, as well as any data or metadata required to enable the computing resource provider to develop, implement and market the instant service. In an embodiment, the network-related service may run as a separate virtual computer system instance upon the computing resource provider's hardware and is called upon by a network gateway upon request. In some embodiments, the computing resource provider provides a software development kit (SDK) or similar, thus enabling anyone with access to the SDK, for example the third party service provider, to develop code and algorithms, e.g., "plugins," that are inherently compatible with the computing resource provider's architecture. For example, the computing resource provider exposes an SDK to a third party service provider, who then develops a plugin implementing a network-related service. However, it is contemplated that any code executable by the computing resources may be used, regardless of whether such code was developed using a computing resource provider-provided SDK or similar framework. Upon submission of the plugin to the computing resource provider, in some embodiments, the computing resource provider makes the plugin available to customer entities 310 that desire the implemented network-related service. Upon a customer entity's request for the network-related service, the plugin is activated, thereby extending the network gateway with the network-related service's functionality, and data is processed by the computing resources implementing the one or more algorithms comprising the network-related service. It will be appreciated that such an implementation is extensible to as many requesting customer entities as the computing resource provider is capable or willing to support.

Figure 4A:
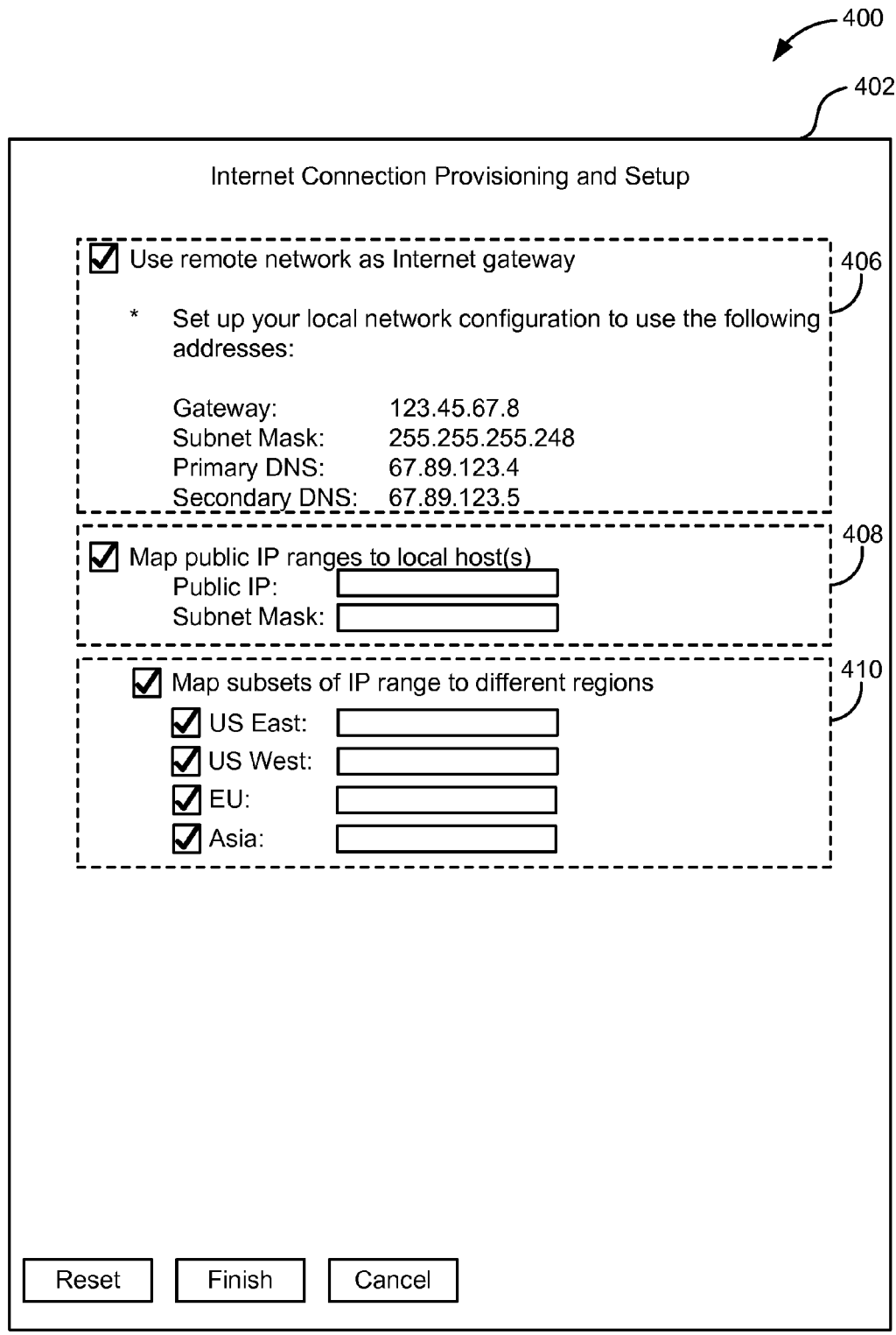
FIG. 4A illustrates an example of a user interface (UI) that can be displayed to a customer entity where the customer entity may specify a configuration, various applications and services the customer entity wishes to use in accordance with at least one embodiment.
Figure 4B:
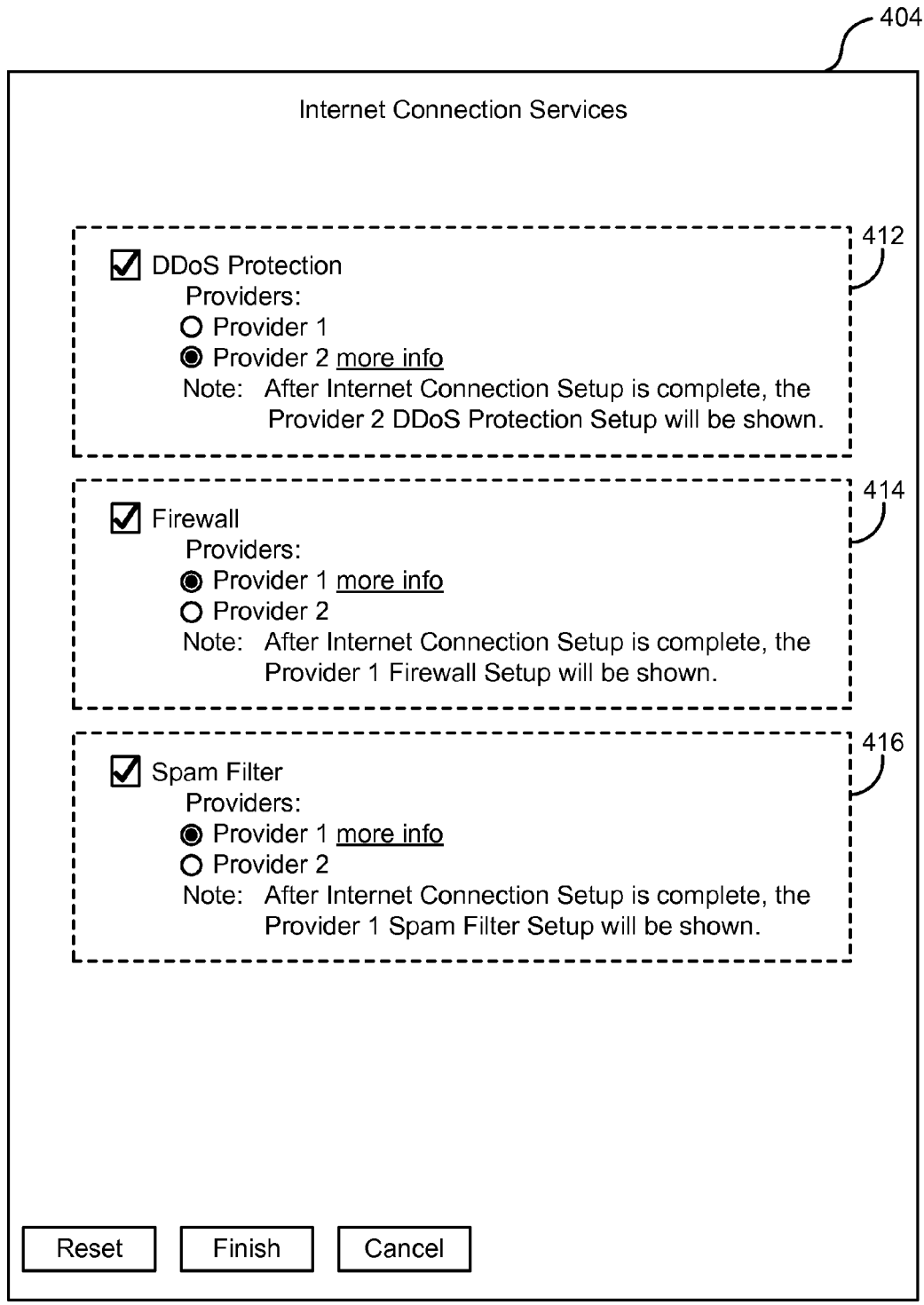
FIG. 4B illustrates an example of a user interface (UI) that can be displayed to a customer entity where the customer entity may specify a configuration, various applications and services the customer entity wishes to use in accordance with at least one embodiment.

A customer entity can be provided with an application and/or interface that allow the customer entity to access and utilize various aspects of the present disclosure. FIGS. 4A and 4B illustrate an example of a user interface (UI) 400 that can be displayed to a customer entity where the customer entity may specify and configure the services the customer entity wishes to use. In this example, a two-step interface is shown, with a provisioning page 402 as shown in FIG. 4A, followed by a service selection page 404 as shown in FIG. 4B. It should be noted, however, that the UI shown in FIGS. 4A and 4B are provided for the purpose of illustration and that various other types of interfaces are considered as being within the scope of the present disclosure. For example, the UI may be graphical as shown in FIGS. 4A and 4B, but have substantially different elements, graphical design, or user interaction design. As a further example, the UI may be a command line interface.

An authorized user of a customer entity, wherein the customer entity may, for example, be a similar customer entity as customer entities 102, 202, and 310, can be provided with an application and/or interface that allow the authorized user to access and utilize various aspects of the present disclosure. FIGS. 4A and 4B illustrate an example of a user interface (UI) 400 that can be displayed to an authorized user where the authorized user may configure and specify the services the customer entity wishes to use. In this example, a network gateway provisioning UI 402 is shown in FIG. 4A, and a service selection UI 404 is shown in FIG. 4B. The network gateway provisioning UI and the service selection UI may be part of the same user interface workflow, or alternatively, may be separate workflows. In some embodiments, the network gateway provisioning UI is provided by a computing resource provider that implements the gateway to be provisioned. The service selection UI may be provided by the gateway-implementing computing resource provider, a third party providing the network-related service, or any other appropriate entity.

On the network gateway provisioning UI, the authorized user is provided with user-selectable UI elements 406-410 enabling the authorized user to select network gateway and connection provisioning options, as well as view important local configuration information. In this example, a number of options are visible, including implementing a network gateway and displaying configuration information 406, the option to map specific public identifiers to customer entity hosts 408, and the option to further refine the mapping of the subset of identifiers to specific regions of external users 410. Various embodiments may have different combinations and/or different types of provisioning options not shown here. In addition, it is contemplated that after provisioning is complete, an authorized user may return to a similar UI or UIs to adjust selected options, view configuration information, or any other appropriate task.

On the service selection UI, the authorized user is provided with user-selectable UI elements 412-416 enabling the authorized user to select from a number of available network-related services that the customer entity may wish to apply to their provisioned connection and/or network gateway. In this example, a number of services are available for selection, including DDoS mitigation 412 for preventing and/or mitigating DDoS attacks upon the customer entity, firewalling 414 that allows the authorized user to configure criteria for filtering, rejecting or passing data, and a spam filter 416 for monitoring e-mail and rejecting unsolicited, dangerous and/or unwanted e-mail. In some embodiments, a computing resource provider furnishes the page and displays one or more available service providers, including third party providers, for each service type to be presented for selection by the authorized user. In some embodiments, a service provider furnishes the UI and enables selection of one or more service types and/or services. Such selections may have contextual information that is viewable through a "more info" link to an informational popup or other techniques for conveying such information. For selected services requiring further configuration by the authorized user, appropriate UIs for configuring the services may be embedded into the service selection page, presented sequentially as separate pages after the selections, or in another fashion a skilled practitioner would consider. In addition, it is contemplated that after service selection is complete, an authorized user may return to a similar UI or UIs to adjust selected options, view configuration information, or any other appropriate task.

Figure 5:
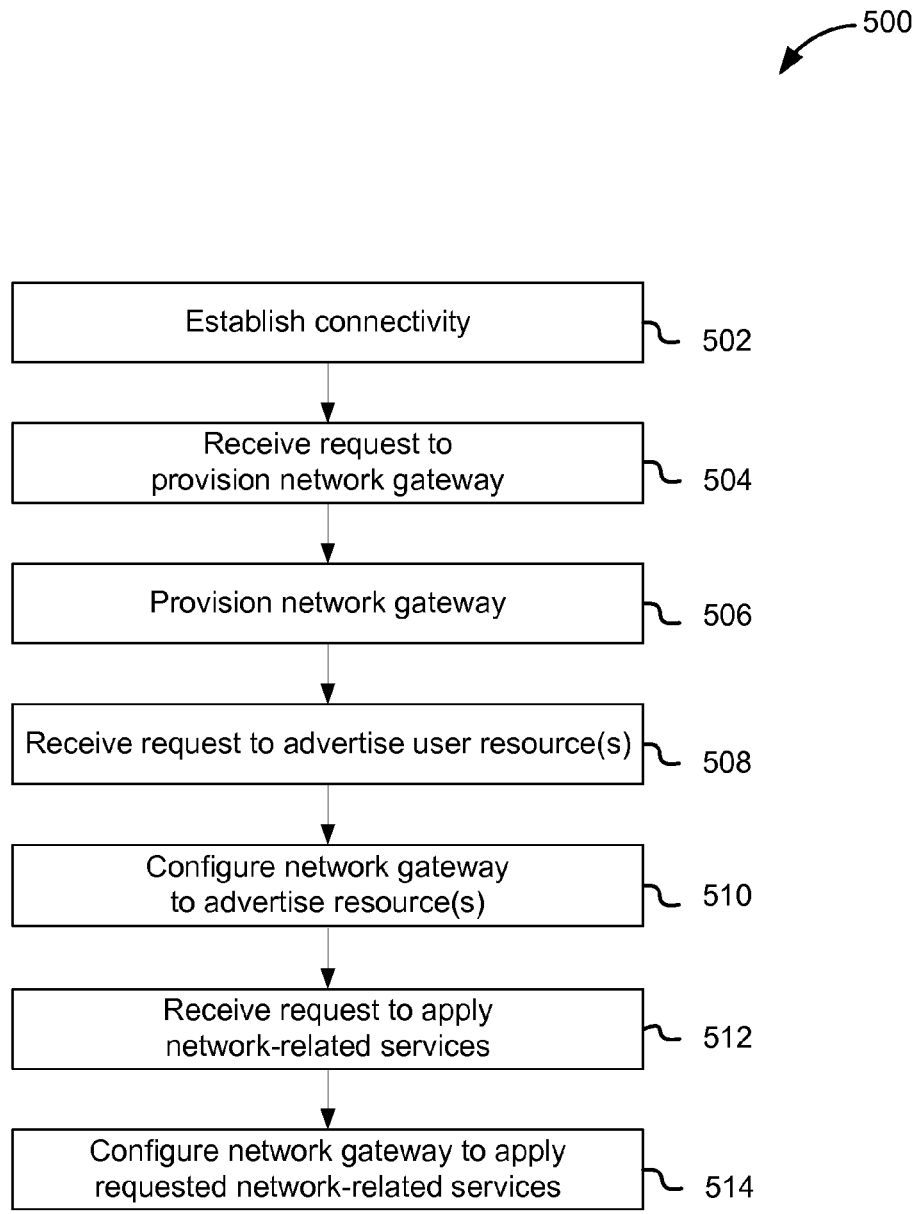
FIG. 5 illustrates an example process for enabling access to a network and/or network-related services via a gateway in accordance with at least one embodiment.

FIG. 5 illustrates an example of a customer entity-initiated process 500 for enabling access to one or more networks via one or more computing resources in a distributed system in accordance with some embodiments. Some or all of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. In an embodiment, the process 500 is performed by a computing resource provider, such as the computing resource provider described above in connection with FIG. 1. However, it should be noted that the process 500 may be performed by any suitable device or collectively by any suitable set of devices.

In the illustrated example process, a customer entity establishes connectivity with a computing resource provider 502. A customer entity may establish connectivity using any appropriate device or technology that permits data to pass between the customer entity and the computing resource provider. For example, the connectivity established can be a direct connection, as previously mentioned. In some embodiments, the connectivity may be established over a public network such as the Internet, either unsecured or secured. Secured connectivity, for example, may be established using, and subsequent to the verification of, a set of security credentials for accessing the computing resource provider. The security credentials may include a certificate or a shared secret key (e.g., asymmetric keys such as RSA keys, symmetric keys). In some embodiments, the connectivity established may be programmatic in nature, e.g., if the customer entity requests connectivity between instances of the same distributed computing resource.

In this example, once connectivity has been established, upon receiving a request from the customer entity to provision a network gateway 504, a network gateway is provisioned using the distributed system of computing resources 506 with which the customer entity established a connection in step 502, thereby further connecting the customer entity to a second network. As previously mentioned, for example in connection with the UI illustrated in FIGS. 4A and 4B, such a request may be received through an API, a UI, or any other appropriate type of interface or service. Thereafter, also as previously mentioned in connection with FIG. 1, the gateway is provisioned using available computing resources and in some embodiments, the provisioned gateway serves as the customer entity's egress and ingress point to a public network, such as the Internet, connected to the computing resources. The request to provision the network gateway may occur by any method, including a query via a user interface, via an API call, or by any other appropriate interface type. Such a request may originate from any associated party, including the connected customer entity and the computing resource provider.

Upon receiving a request from the customer entity to advertise a public identifier such as an IPv4 or IPv6 address on behalf of a customer entity's resources based on customer entity-specified criteria 508, the provisioned gateway is configured to route external users (e.g., Internet users) meeting those criteria to the customer entity's host or hosts mapped to the public identifier 510. For example, the computing resource provider may divide its computing resources into regions. The regions may be divided according to one or more criteria and/or characteristic(s) of the connecting external users or of the resources of the computing resource provider, the criteria and/or characteristic(s) including but not limited to geographic location, performance capabilities such as throughput or latency, uptime, availability, security capabilities, or other logical groupings. Furthermore, the regions may consist of multiple sub-regions that are grouped along similar criteria and/or characteristic(s). External users connecting to a computing resource or resources corresponding with one of the regions may be routed, for example, to the customer entity-provided public identifier associated with a customer entity web server dedicated to serving the aforementioned region. Such routing may occur over any appropriate medium and in any appropriate manner, including but not limited to an IPSec tunnel. The customer entity resource may be manifested as a host, physical server, multiple servers, a portion of a server, a portion of a distributed system, a type of computing functionality (e.g., a given Web service), or any other mechanism for sending, storing, processing and/or receiving data. Such resources may be a computing resource provider's resources, an instance thereof, or alternatively, local to the customer entity. The request to advertise a customer entity's resources may occur by any method, including but not limited to a query via a user interface, via a web service and/or via an API call. Such a request may originate from any associated party, including the connecting customer entity and the computing resource provider.

Upon receiving a customer entity's request to apply network-related services 512, the computing resources are configured to apply the elected network-related services to data passing through the computing resources and/or implemented network gateway 514. As mentioned, for example in connection with FIG. 3, such services may have been developed by any party (e.g., a third party) and may be available to the computing resources and/or implemented network gateway in any manner, including but not limited to retrieval from a remote server through a network (such as a server under the control of a third party network service provider), from storage local to the computing resources, and/or held in random-access memory (RAM). It is contemplated that the services may be provided by and/or implemented using resources of either a third party network service provider or the computing resource provider. As one example, a third party network service provider may implement such services upon an instance or subset of resources provided by the computing resource provider but under the control of the third party network service provider. In this example, since the network gateway is the customer entity's Internet ingress and egress point, all data is subject to the implemented network-related services. However, embodiments are contemplated where only a subset of network traffic is subjected to the network-related services, or different network-related services are configured to treat disparate streams of data. The determination of which data apply to which services, as well as the level and nature of traffic subject to a given service, may be determined by any appropriate process, whether automatic or manual, and either by the customer entity or computing resource provider.

Figure 6:
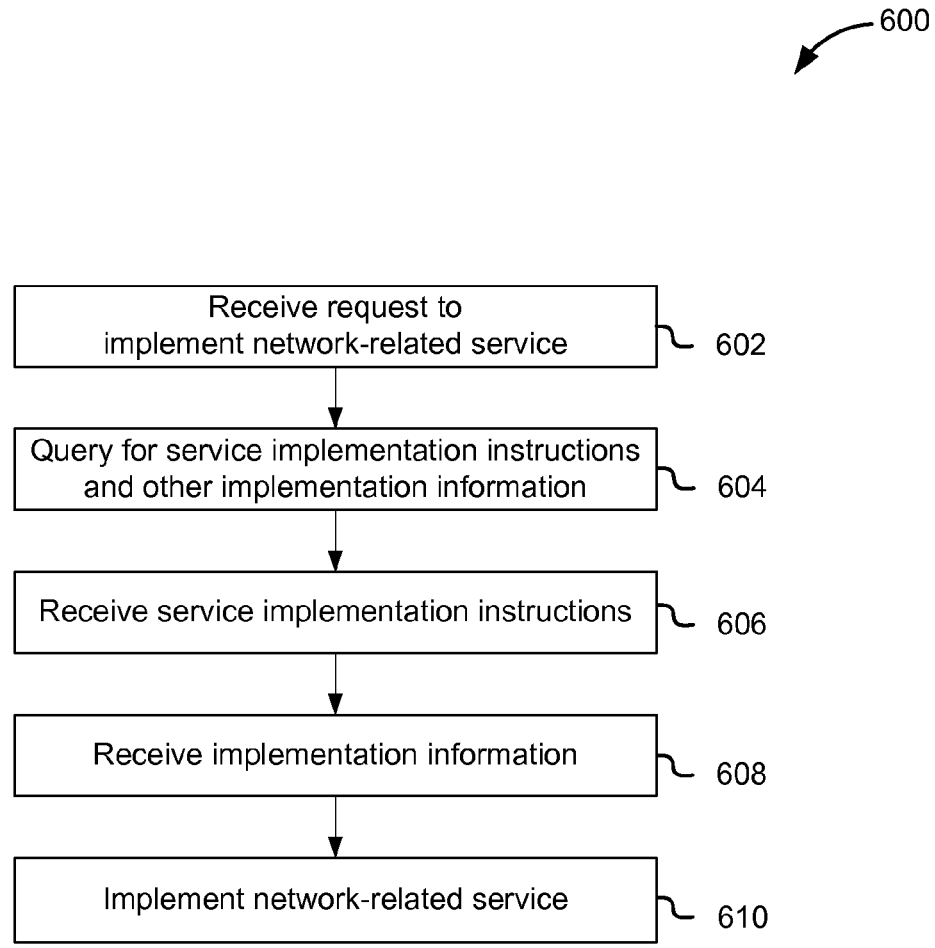
FIG. 6 illustrates an example process for enabling third party network-related service providers to provide network-related services in accordance with at least one embodiment.

FIG. 6 illustrates an example of process 600 for providing access to a set of network-related services in accordance with some embodiments. Such network-related services may be implemented, for example, as discussed in connection with FIG. 3. In the example illustrated in the present FIG. 6, a network-related service provider requests implementation of a network-related service by a computing resource provider 602. Such a request may be manifested by any appropriate process, including but not limited to submission over a network or by local request, and via a UI, e-mail, or programmatic techniques such as APIs or Web services. Upon receiving the request, the computing resource provider queries the service provider for service implementation details 602 and additional implementation information 604, if necessary. In return, the service provider submits (and the computing resource provider receives) the service implementation details 606 and the requested additional implementation information 608. The queries and submissions may be transmitted via the same or different channels or methods as the initial request. The received data (i.e., the service implementation details and additional implementation information) may be in any form appropriate to the specific implementation of the process, including but not limited to source code, binaries, pseudocode, or in the form of a markup language different from that required or used by the final implementation. Such data may include an encoding or other manifestation of at least one algorithm related to the network-related service. As mentioned, the received data may be in the form of "ready-to-run" code, such as a "plugin" implemented with or without the benefit of a computing resource provider-provided SDK.

In this example, once the requisite data has been received by the computing resource provider, the computing resource provider implements the network-related service using one or more computing resources connected to at least one network 610, thereby making it available over the at least one network to customer entities wishing to use the service. Implementation may take many forms, including standalone availability as a Web service, availability in conjunction with a network gateway as previously discussed in connection with at least FIG. 3, or as a download over a network. The network may be private (e.g., VPN, Intranet, or direct connection) or public (e.g., Internet).

As will be appreciated, the steps outlined herein may occur as a discrete sequence, or multiple steps may be combined into a single action. For example, a single Web service call to publish a network-related service may include the request, the query, and the submission as a single step. In some embodiments, a network-related service provider may perform the steps through a user interface. In some embodiments, the network-related service provider and the computing resource provider are the same.

Figure 7:
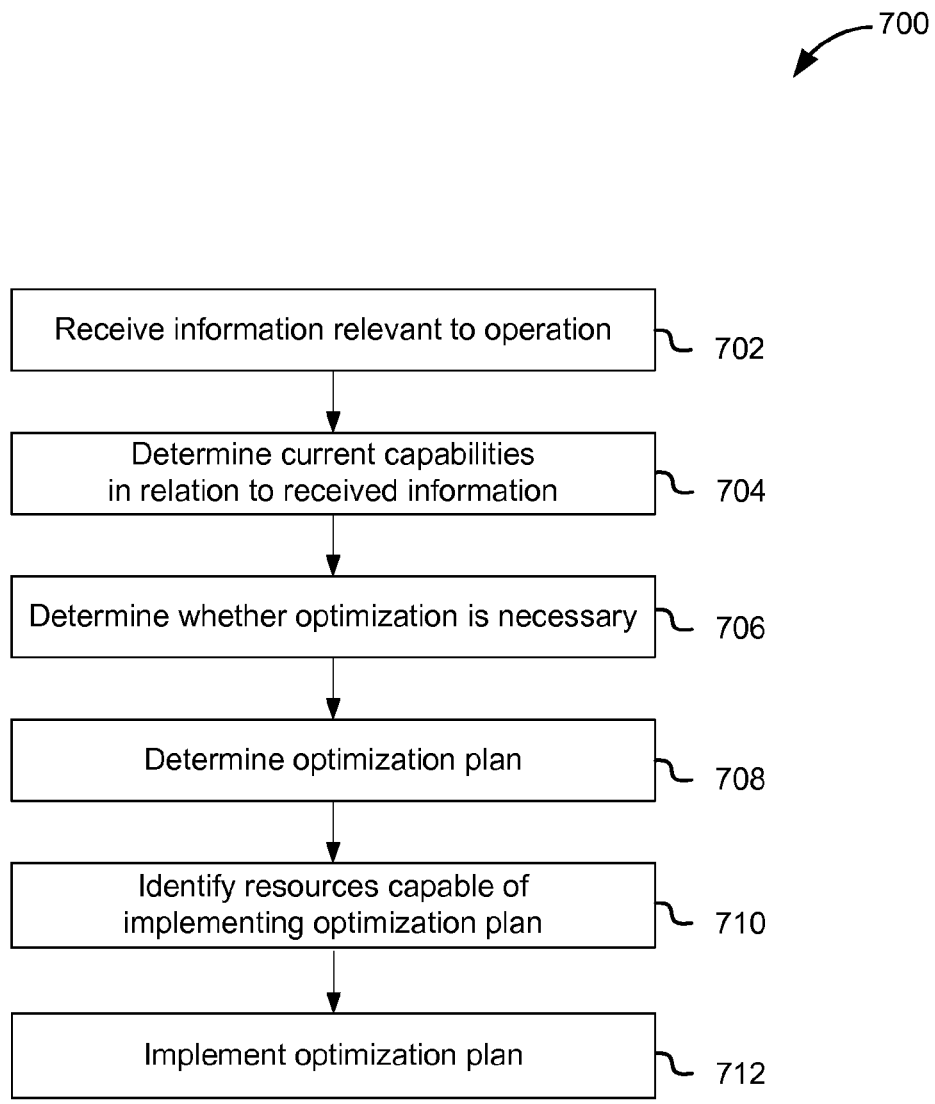
FIG. 7 illustrates an information flow chart for optimizing computing resources in accordance with at least one embodiment.

FIG. 7 illustrates an example of process 700 for optimizing a network-related service using a distributed or shared computing resource. For example, the resource receives information relevant to the operation of a network-related service implemented on the resource 702. In some embodiments, network-related services include a network gateway as discussed in connection with FIGS. 1 and 2, and/or other network-related services as discussed in connection with FIG. 3. The operational information may be determined by external monitors, from reports by the customer entity, or by the computing resource itself. The information can include, but is not limited to, network bandwidth, processing load, data storage requirements, and the like. Such information may be received periodically, continuously, or sporadically (e.g., as the result of an external monitor detecting a condition requiring action). The resource then determines its current capabilities in relation to the received information 704. Such a determination may be triggered by the receipt of information in step 702, or in an alternative embodiment, independent and/or continuous and therefore unrelated to the receipt of information in step 702.

Based on the information received in steps 702 and 704, the resource then determines whether optimization of the network-related service's implementation is necessary 706. As will be contemplated, the determination may occur based on one or multiple criteria as previously discussed. If the resource determines that optimization is necessary in step 706, the resource determines an optimization plan 708. The optimization plan may take one of several forms. For example, if network traffic exceeds the computing resource's ability to process it in light of implemented network-related services, the resource may determine that additional computing resources are necessary, and thus the implementation plan may be a workflow for adding the requisite resources. Conversely, if the resource determines that the available computational reserve is disproportionately large relative to that of other uses or instances of the resource, the resource may determine what resources may safely be released for other uses. In some embodiments, where the information gathered in steps 702 and 704 indicate a lapse in functionality, the optimization plan may include steps to temporarily restore functionality (e.g., by finding an appropriate resource to bypass the failed or poorly performing component) and, in some embodiments, alert a technician. In some embodiments, a resource comprises disparate functional units with differing capabilities, and thus the resource must determine what constituent resources are best able to implement the optimization plan 710. Upon determining the appropriate resources necessary to implement the plan, the resource executes or implements the plan 712 upon the constituent resource or resources determined in step 710. As previously mentioned, in some embodiments, the implementation may involve scaling the level of resources committed up or down, changing the type of some or all of the allocated resources to a more applicable or optimal type, temporarily "failing over" to the determined resources and using the determined resources to kick of a remediation plan (e.g., automatically submitting a problem report such that a technician is alerted), and/or suspending the service entirely.

Figure 8:
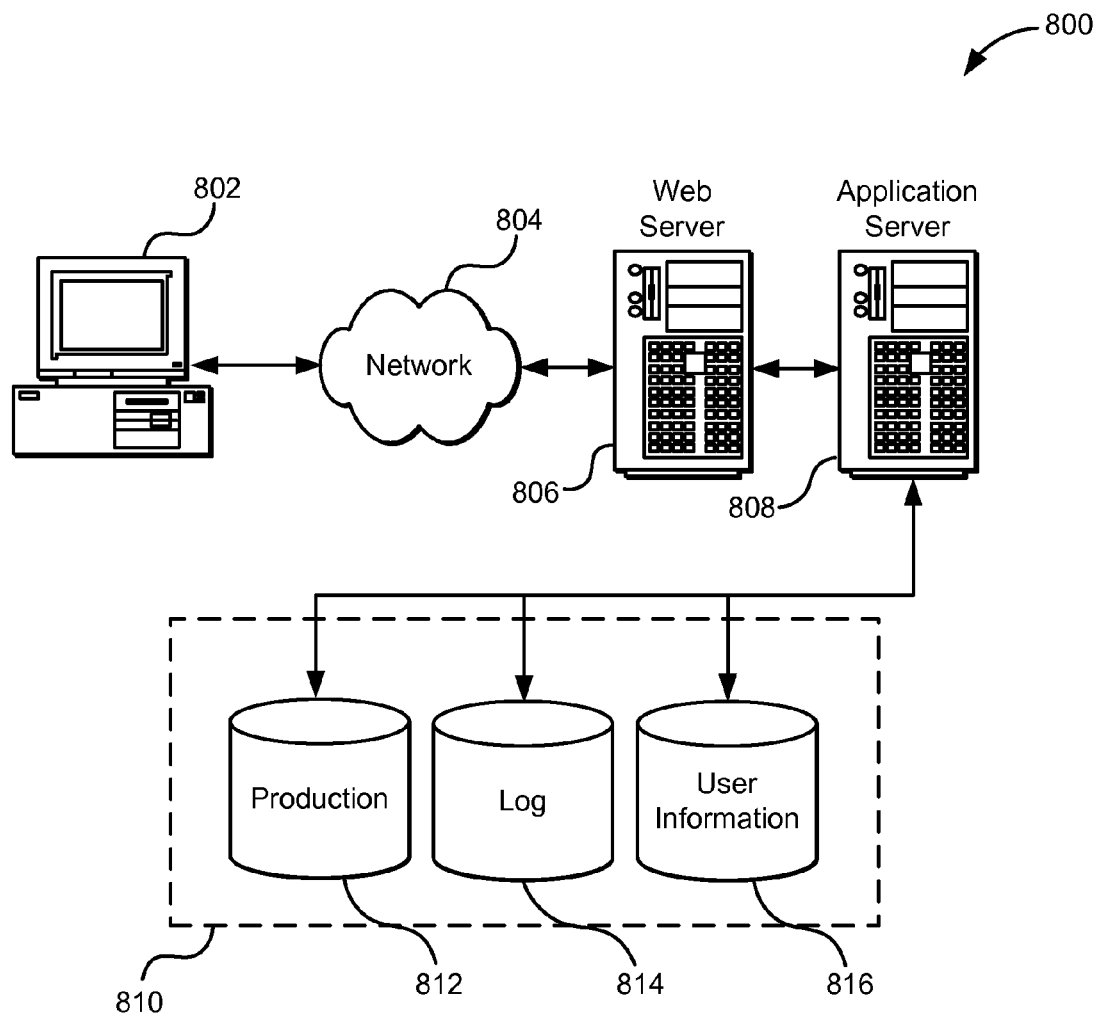
FIG. 8 illustrates an environment in which various embodiments can be implemented.

FIG. 8 illustrates an example of an environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/ or video to be transferred to the user, which may be served to the user by the Web server in the form of HTML, XML, or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases, or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out various embodiments. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for enabling access to one or more networks, comprising:
    establishing, by one or more computer systems configured with executable instructions, a network connection with at least one customer entity;
    receiving, over the network connection, a provisioning request from the at least one customer entity to provision a network gateway;
    provisioning, by the one or more computer systems, a virtual computer system instance as the network gateway to connect the at least one customer entity to a public network via the provisioned virtual computer system instance;
    receiving, over the network connection, a service election request from the at least one customer entity to apply one or more network-related services to the network gateway the one or more network-related services performing at least one of monitoring, securing, filtering, or protecting data;
    receiving, from the at least one customer entity, a request for a service of the one or more network-related services, the request including an identification of the service and a service provider of the service;
    instantiating, on hardware under control of the one or more computer systems, an implementation of a virtual instance of the one or more network-related services within the virtual computer system instance in accordance with the service election request and executable code provided by the service provider, the virtual instance of the one or more network-related services extending at least one capability of the network gateway to a subset of network gateway traffic associated with the at least one customer entity; and
    configuring the one or more computer systems in accordance with the service election request, such that the one or more computer systems is operable to adjust the at least one capability relating to an operation of the network gateway in response to a change to a demand of the network gateway, the at least one customer entity, or the one or more computer systems, the subset of network gateway traffic being determined based at least in part on the received service election request.

2. The computer-implemented method of claim 1, wherein the network connection is a direct physical connection between the customer entity and the virtual computer system instance.

3. The computer-implemented method of claim 1, further comprising:
    receiving, over the network connection, a publication request from the at least one customer entity to advertise at least one public identifier to identify at least one resource under control of the at least one customer entity; and
    configuring the one or more computer systems in accordance with the publication request, such that the at least one resource is identifiable by at least one external user connected to the public network as associated with the at least one public identifier.

4. The computer-implemented method of claim 3, wherein configuring the one or more computer systems in accordance with the publication request includes configuring the one or more computer systems to identify, using the at least one public identifier, at least one host in accordance with a region of at least one of the at least one external user or the one or more computer systems.

5. The computer-implemented method of claim 1, wherein the one or more computer systems is further configured to provide a user interface (UI) for remote management of provisioning or reconfiguration of the network gateway to the at least one customer entity.

6. A computer-implemented method for enabling access to one or more networks, comprising:
    receiving, by one or more computer systems configured with executable instructions, a provisioning request to provision a virtual computer system instance as a network gateway for at least one customer entity, the network gateway being configured to connect to a private network, and the customer entity being separate from the computing resource provider; and
    provisioning, by the one or more computer systems, the network gateway to connect the at least one customer entity to a public network via the provisioned virtual computer system instance;
    operating, on behalf of the at least one customer entity, the network gateway to serve as a public network access point for the at least one customer entity;
    receiving, by at least one of the one or more computer systems, a service election request from the at least one customer entity to apply one or more network-related services to the private network, the one or more network-related services performing at least one of monitoring, securing, filtering, or protecting data; and
    instantiating, on hardware under control of the one or more computer systems, an implementation of the one or more network-related services within the virtual computer system instance in accordance with the service election request such that at least one of the one or more network-related services extend at least one capability to network traffic of the private network, the network traffic of the private network being associated with the at least one customer entity, the one or more computer systems being operable to adjust at least one capability relating to an operation of the network gateway in response to a change in demand of at least one of the network gateway, the at least one customer entity, or the one or more computer systems.

7. The computer-implemented method of claim 6, further comprising:
    receiving a publication request from the at least one customer entity to advertise at least one public identifier to identify at least one resource under control of the at least one customer entity; and
    configuring the one or more computer systems in accordance with the publication request, such that the at least one resource is identifiable by at least one external user connected to the public network as associated with the at least one public identifier.

8. The computer-implemented method of claim 6, wherein the provisioning of the network gateway is achieved by at least one of the customer entity or the computing resource provider invoking an application programming interface (API) provided by the computing resource provider.

9. The computer-implemented method of claim 6, further comprising:
receiving code for implementing at least one of the one or more network-related services from a third party; and
executing, upon selection by the at least one customer entity of the at least one of the one or more network-related services, the received code.

10. A computer system for enabling access to one or more networks, comprising:
one or more processors; and
memory, including instructions executable by the one or more processors to cause the computer system to at least:
instantiate virtual computer system instances to act as network gateways to a public communications network on behalf of customer entities that connect to the computer system through corresponding private customer entity networks;
manage network traffic from the public communications network received through the virtual computer system instances in accordance with requirements specified by the corresponding customer entities, the corresponding customer entities capable of specifying at least one network-related service and a provider of the at least one network-related service, the at least one network-related services performing at least one of monitoring, securing, filtering, or protecting data;
instantiate an implementation of the at least one network-related service within the virtual computer system instances in accordance with instructions provided by the provider of the at least one network-related service, the at least one network-related service extending at least one capability of the virtual computer system instances to a subset of network traffic of the private customer entity networks; and
modify at least one capability relating to an operation of the virtual computer system instances in response to a change in demand of the virtual computer system instances.

11. The computer system of claim 10, wherein the computer system provisions the virtual computer system instances in response to requests submitted by the customer entities.

12. The computer system of claim 10, wherein the computer system instantiates the virtual computer system instances and extends the at least one capability of the virtual computer system instances with the at least one network-related service in response to requests submitted by the customer entities.

13. The computer system of claim 10, wherein the instructions further include, in response to requests submitted by the customer entities, routing, using the virtual computer system instances and in accordance with the requests, network traffic from the public communications network received through the virtual computer system instances to resources under the control of the customer entities.

14. The computer system of claim 11, wherein the request is received by the computer system through a user interface (UI) provided to the customer entities by the computer system.

15. One or more non-transitory computer-readable storage media having collectively stored thereon executable instructions that, when executed by one or more processors of a computing resource provider's computer system, cause the computer system to at least:
receive a provisioning request to provision a network gateway for at least one customer entity that is separate from the computing resource provider;
instantiate a virtual computer system instance to act as the network gateway and connect the at least one customer entity to a public network, the at least one customer entity connecting to the computer system through a customer entity network;
manage network traffic from the public network received through the virtual computer system instance in accordance with requirements specified by the customer entity;
receive, by at least one of the computer system, a service election request from the at least one customer entity to apply the one or more network-related services to the virtual computer system instance, the received service election request identifying the at least one network-related service and a provider of the at least one network-related service, one or more network-related services performing at least one of monitoring, securing, filtering, or protecting data;
instantiate an implementation of the at least one network-related service in accordance with instructions provided by the provider of the at least one network-related service, the at least one network-related service extending at least one capability of the virtual computer system instance to a subset of network traffic of the public network, the subset of network traffic associated with the at least one customer entity; and
modify at least one capability relating to an operation of the virtual computer system instance in response to a change in demand of at least one of the virtual computer system instance, the at least one customer entity, the computing resource provider, or the computer system.

16. The computer-readable storage media of claim 15, wherein receiving the provisioning request further includes receiving a publication request to advertise at least one public identifier to identify at least one resource under control of the at least one customer entity.

17. The computer-readable storage media of claim 16, wherein instantiating the virtual computer system instance further includes configuring the computer system in accordance with the publication request, such that at least one host is identifiable by at least one external user connected to the public network as being associated with the at least one public identifier.

18. The computer-readable storage media of claim 15, wherein the provisioning request originates from at least one of the computing resource provider and the computer system provisioning the network gateway.

19. The computer-readable storage media of claim 15, wherein at least the provisioning request is initiated via a direct network connection with the at least one customer entity.

20. The computer-readable storage media of claim 15, further including executable instructions that, when executed by the one or more processors of the computing resource provider's computer system, cause the computer system to at least further:
- determine at least one computing resource appropriate for responding to the change in demand; and
- configure the computer system to use the at least one computing resource in instantiating the virtual computer system instance.

21. The computer-implemented method of claim 1, wherein the virtual computer system instance is provisioned to connect the at least one customer entity to the public network via an endpoint in a private network of the at least one customer entity, and the identified service extending at least one capability of the network gateway to a subset of network gateway traffic of the private network.

22. The computer-implemented method of claim 6, wherein the received provisioning request includes a selection of a particular service provider for implementing the one or more network-related services.

* * * * *